US012455627B2

(12) United States Patent
Li et al.

(10) Patent No.: US 12,455,627 B2
(45) Date of Patent: Oct. 28, 2025

(54) VIBRATION CONTROL METHOD FOR ELECTRONIC DEVICE

(71) Applicant: ASUSTEK COMPUTER INC., Taipei (TW)

(72) Inventors: Sih Ci Li, Taipei (TW); Hung-Chieh Wu, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 190 days.

(21) Appl. No.: 18/191,768

(22) Filed: Mar. 28, 2023

(65) Prior Publication Data

US 2024/0143080 A1    May 2, 2024

(30) Foreign Application Priority Data

Nov. 1, 2022 (TW) .................................. 111141646

(51) Int. Cl.
*G06F 3/048* (2013.01)
*G06F 3/01* (2006.01)
*G06F 3/04886* (2022.01)
*H02P 5/68* (2006.01)

(52) U.S. Cl.
CPC .......... *G06F 3/016* (2013.01); *G06F 3/04886* (2013.01); *H02P 5/68* (2013.01)

(58) Field of Classification Search
CPC .................................................... G06F 3/016
See application file for complete search history.

(56) References Cited

U.S. PATENT DOCUMENTS

| 9,798,388 B1* | 10/2017 | Murali ................. G06F 3/0487 |
| 10,802,667 B1* | 10/2020 | Ramasamy ......... G06F 3/04815 |
| 10,825,245 B1* | 11/2020 | Ramasamy ............ G06V 40/19 |
| 11,231,785 B2* | 1/2022 | Cho ....................... G06F 3/0481 |
| 11,344,727 B2* | 5/2022 | Kilgard ............. A61N 1/36139 |

(Continued)

FOREIGN PATENT DOCUMENTS

| CN | 205549522 U | 9/2016 | |
| CN | 112604266 A * | 4/2021 | ........... G06F 3/0416 |

(Continued)

OTHER PUBLICATIONS

Wu et al., A Vibro-Tactile System for Image Contour Display, 2011, IEEE, 6 pages. (Year: 2011).*

(Continued)

*Primary Examiner* — Linh K Pham
(74) *Attorney, Agent, or Firm* — MUNCY, GEISSLER, OLDS & LOWE, P.C.

(57) ABSTRACT

A vibration control method adapted to an electronic device is provided. The electronic device includes a touch screen for showing a picture and a motor for generating a vibration effect. The vibration control method includes: determining a target image based on a setting signal, and generating a control instruction, where the control instruction is related to the target image and used for controlling the motor to generate the vibration effect; determining a location of the target image on the picture and defining a vibration enabling area based on the location of the target image; and defining the vibration enabling area as related to the control instruction. An electronic device adapted to the vibration control method is also provided.

10 Claims, 10 Drawing Sheets

(56) References Cited

U.S. PATENT DOCUMENTS

| | | | |
|---|---|---|---|
| 11,366,563 B2* | 6/2022 | Kim | G06F 1/1681 |
| 2002/0177471 A1* | 11/2002 | Kaaresoja | G08B 6/00 |
| | | | 455/567 |
| 2007/0290988 A1* | 12/2007 | Nogami | G06F 3/016 |
| | | | 345/156 |
| 2009/0102805 A1* | 4/2009 | Meijer | G06F 3/167 |
| | | | 345/173 |
| 2011/0244963 A1* | 10/2011 | Grant | A63F 13/285 |
| | | | 463/37 |
| 2012/0113008 A1* | 5/2012 | Makinen | G06F 3/04883 |
| | | | 345/168 |
| 2012/0274662 A1* | 11/2012 | Kim | G11B 27/10 |
| | | | 345/650 |
| 2014/0176455 A1* | 6/2014 | Araki | G06F 3/0488 |
| | | | 345/173 |
| 2014/0354553 A1* | 12/2014 | Dai | G06F 3/044 |
| | | | 345/173 |
| 2017/0021762 A1* | 1/2017 | Daman | B60K 37/00 |
| 2017/0097682 A1* | 4/2017 | Endo | G06F 3/0484 |
| 2017/0115733 A1* | 4/2017 | Du | G06F 3/0416 |
| 2017/0160806 A1* | 6/2017 | He | G06F 1/1626 |
| 2017/0169674 A1* | 6/2017 | Macours | G06F 3/016 |
| 2017/0341108 A1* | 11/2017 | Mao | H02K 33/00 |
| 2018/0210551 A1* | 7/2018 | Kitagawa | G06F 3/04847 |
| 2020/0050277 A1* | 2/2020 | Wang | G06F 3/016 |
| 2020/0350810 A1* | 11/2020 | Liu | H02K 33/12 |
| 2021/0191516 A1* | 6/2021 | Chen | G06F 3/017 |
| 2021/0389823 A1* | 12/2021 | Yokoyama | G06F 3/165 |
| 2024/0111365 A1* | 4/2024 | Varrato | G06F 3/0446 |
| 2024/0133734 A1* | 4/2024 | Kawamura | G01H 9/00 |
| 2024/0426790 A1* | 12/2024 | Munakata | G01N 29/04 |

FOREIGN PATENT DOCUMENTS

| | | | | |
|---|---|---|---|---|
| CN | 108475116 B | 6/2021 | | |
| CN | 110941387 B | 7/2021 | | |
| CN | 113821138 A | 12/2021 | | |
| CN | 114168003 A | 3/2022 | | |
| CN | 114860085 A | * | 8/2022 | G06F 3/016 |
| WO | WO-2014117125 A1 | * | 7/2014 | G06F 3/015 |

OTHER PUBLICATIONS

Ryu et al., T-hive : Vibrotactile Interface Presenting Spatial Information on Handle Surface, 2009, IEEE, 6 Pages (Year: 2009).*

Basdogan et al., A Review of Surface Haptics: Enabling Tactile Effects on Touch Surfaces, 2020, IEEE, 21 pages (Year: 2020).*

Yang et al., Vibrotactile Display for Hand-held Input Device Providing Spatial and Directional Information, 2009, IEEE, 6 pages (Year: 2009).*

Office Action (with Search Report) issued in corresponding TW application No. 111141646 dated Feb. 21, 2024 (8 pages).

* cited by examiner

VIBRATION CONTROL METHOD FOR ELECTRONIC DEVICE

BACKGROUND OF THE INVENTION

Field of the Invention

The disclosure relates to a vibration control method for an electronic device, and in particular, to a vibration control method for a handheld electronic device.

Description of the Related Art

When a user performs a touch operation on a handheld electronic device, the handheld electronic device cannot provide tactile feedback as that for operation on a physical control key, resulting in problems such as a finger sliding out of a preset range, a false touch, or failure to accurately trigger a function.

BRIEF SUMMARY OF THE INVENTION

The disclosure provides a vibration control method adapted to an electronic device. The electronic device includes a touch screen and a motor, where the touch screen is configured to show a picture, and the motor is configured to generate a vibration effect. The vibration control method includes: determining a target image based on a setting signal, and generating a control instruction, where the control instruction is related to the target image and used for controlling the motor to generate the vibration effect; determining a location of the target image on the picture and defining a vibration enabling area based on the location of the target image; and defining the vibration enabling area as related to the control instruction.

The disclosure provides a vibration control method adapted to an electronic device. The electronic device includes a touch screen and two motors. The two motors are located on opposite sides of the touch screen, the touch screen is configured to show a picture, and the two motors are configured to generate a vibration effect. The vibration control method includes: determining a target image based on a setting signal, and generating a control instruction related to the target image; determining a location of the target image on the picture and defining a vibration enabling area based on the location of the target image; defining the vibration enabling area as related to the control instruction; and determining a motor controlled by the control instruction in the two motors based on a location of the vibration enabling area on the picture.

The disclosure further provides an electronic device, including a touch screen, a motor, and a control unit. The touch screen is configured to show a picture. The motor is configured to generate a vibration effect. The control unit is electrically coupled to the touch screen and the motor, and is configured to determine a target image based on a setting signal and generate a control instruction, where the control instruction is related to the target image and used for controlling the motor to generate the vibration effect; determine a location of the target image on the picture and define a vibration enabling area based on the location of the target image; and define the vibration enabling area as related to the control instruction.

Through the vibration control method and the electronic device provided by the disclosure, a vibration enabling area is defined on a picture based on a target image, and the vibration enabling area is defined as related to a control instruction. When a user touches the vibration enabling area, the control instruction causes a motor to generate a vibration effect. Therefore, the user is provided with tactile feedback as if a physical key is operated.

DETAILED DESCRIPTION OF THE EMBODIMENTS

More detailed descriptions of specific embodiments of the disclosure are provided below with reference to the schematic diagrams. The features and advantages of the disclosure are described more clearly according to the following description and claims. It should be noted that all of the drawings use very simplified forms and imprecise proportions, only being used for assisting in conveniently and clearly explaining the objective of the embodiments of the disclosure.

Figure 1:
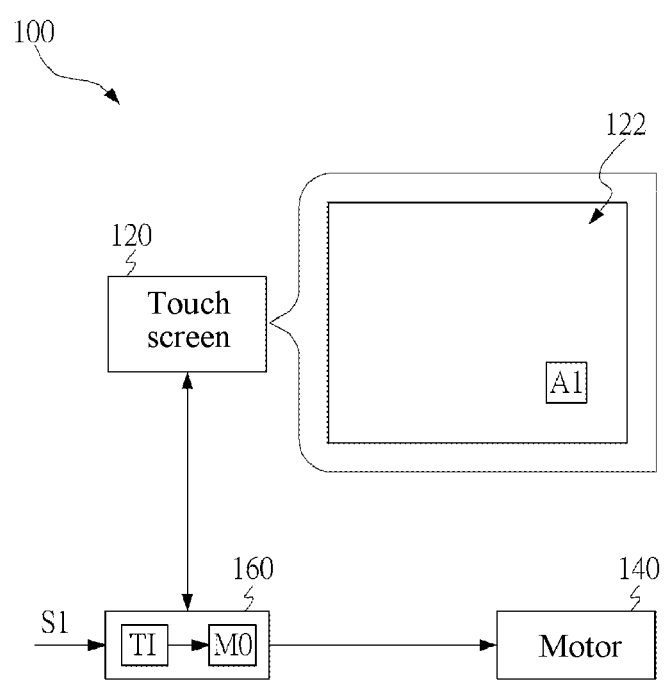
FIG. 1 is a schematic diagram of an electronic device adapted to generate a vibration effect according to a first embodiment of the disclosure.

FIG. 1 is a schematic diagram of an electronic device 100 adapted to generate a vibration effect according to a first embodiment of the disclosure. In an embodiment, the electronic device 100 is a tablet computer, a smart phone, a handheld game console, or the like.

The electronic device 100 includes a touch screen 120, a motor 140, and a control unit 160. The touch screen 120 is configured to show a picture 122, for example, a game picture. The motor 140 is configured to generate a vibration effect. The control unit 160 is electrically coupled to the touch screen 120 and the motor 140, and is configured to determine a target image TI based on a setting signal S1 and generate a control instruction M0.

The target image TI is used for defining a vibration enabling area A1 on the picture 122. The control instruction M0 is related to the target image TI and is used for controlling the motor 140.

The control unit 160 defines the vibration enabling area A1 on the picture 122 based on the target image TI, and defines the vibration enabling area A1 as related to the control instruction M0. In this way, as long as a user touches a location corresponding to the vibration enabling area A1 on the touch screen 120, the control unit 160 controls the motor 140 to generate the vibration effect based on the control instruction M0.

Figure 2:
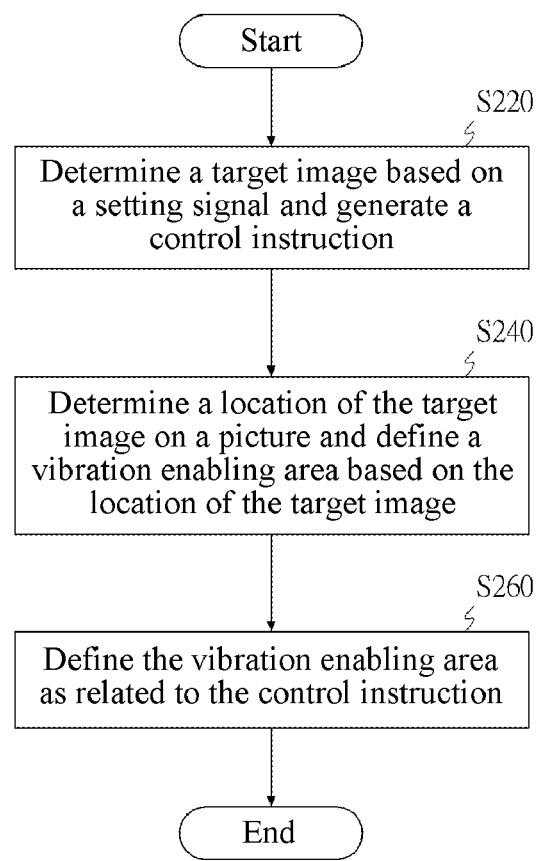
FIG. 2 is a flowchart of a vibration control method according to a first embodiment of the disclosure.

FIG. 2 is a flowchart of a vibration control method according to a first embodiment of the disclosure. The vibration control method is adapted to the electronic device 100 shown in FIG. 1. The vibration control method in this embodiment includes the following steps.

First, in step S220, a target image TI is defined based on a setting signal S1 and a control instruction M0 is generated. The target image TI is a touch location that generates tactile feedback. In an embodiment, the target image TI is a particular touch key, a selection icon, or the like the user expects on a game picture. The control instruction M0 is related to the target image TI, and is configured to control the motor 140 to generate a vibration effect.

In an embodiment, the control instruction M0 includes a motor control parameter set. In an embodiment, the motor control parameter set includes a vibration time parameter and a vibration intensity parameter to set various vibration states.

Figure 3:
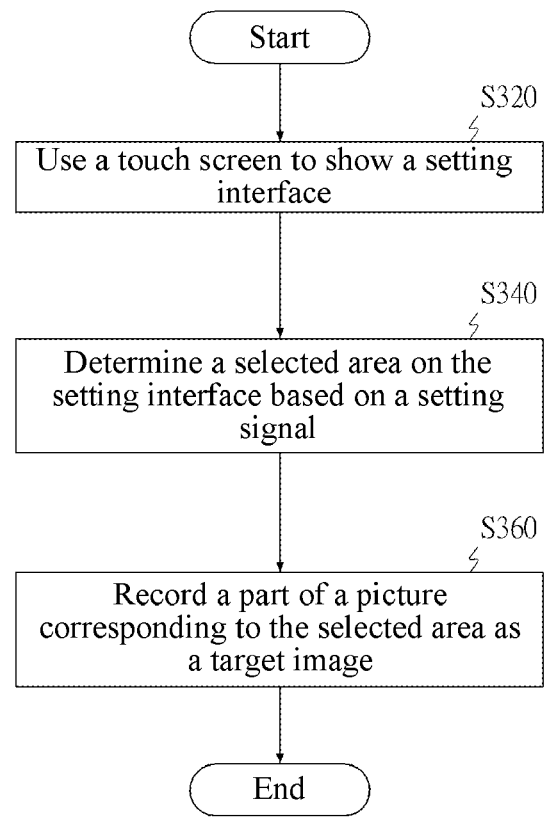
FIG. 3 shows an embodiment of step S220 in FIG. 2.

FIG. 3 shows an embodiment of step S220 in FIG. 2.

First, in step S320, a touch screen 120 is used to show a setting interface. The setting interface allows the user to set the target image TI and the corresponding control instruction M0.

In step S340, a selected area B1 is determined on the setting interface based on the setting signal S1. In an embodiment, the setting signal S1 is a touch signal the user inputs through the touch screen 120.

Next, in step S360, a part of the picture corresponding to the selected area B1 is recorded as the target image TI.

Figure 4:
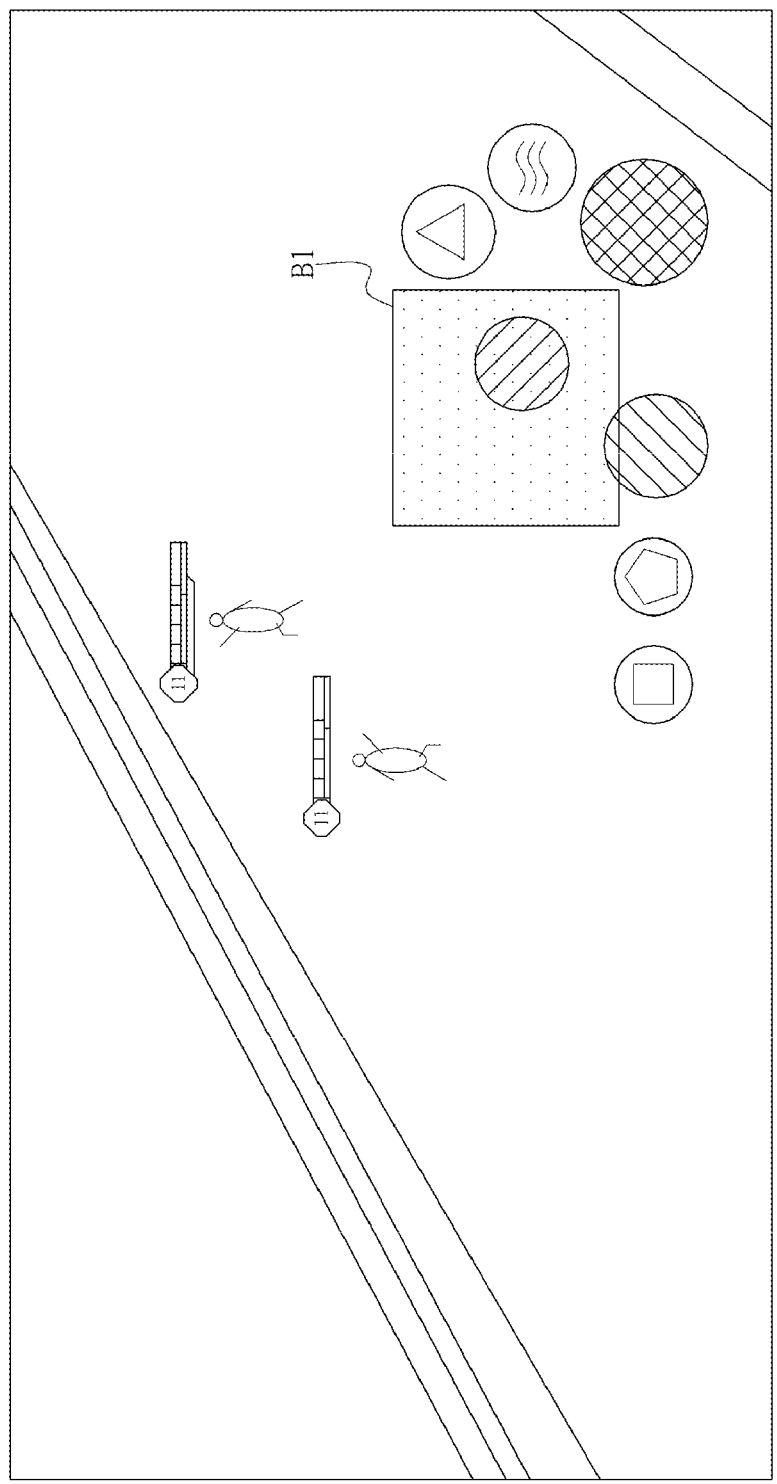
FIG. 4 is a schematic diagram of a setting interface according to an embodiment of the disclosure.

Referring to FIG. 4 together, FIG. 4 is a schematic diagram of a setting interface according to an embodiment of the disclosure. The setting interface is shown on the touch screen 120, for the user to input the setting signal S1 to determine the target image TI and the corresponding control instruction M0.

In an embodiment, the setting interface is directly superimposed on the game picture. As shown in FIG. 4, a block represents the area B1 selected by the user on the setting interface. The user box-selects or moves the selected area B1 on the setting interface by touching. An image corresponding to the selected area B1 on the game picture is the target image TI.

After finishing the setting of the target image TI, the user sets a vibration sense corresponding to the target image TI through the setting signal S1 (that is, the control instruction M0 related to the target image TI is generated).

In an embodiment, the setting interface provides various default vibration senses for the user to select.

In an embodiment, the setting interface provides a vibration sense setting page for the user to input or adjust the motor control parameter set that includes a vibration time parameter, a vibration intensity parameter, and the like, so as to set various vibration states.

Figure 5:
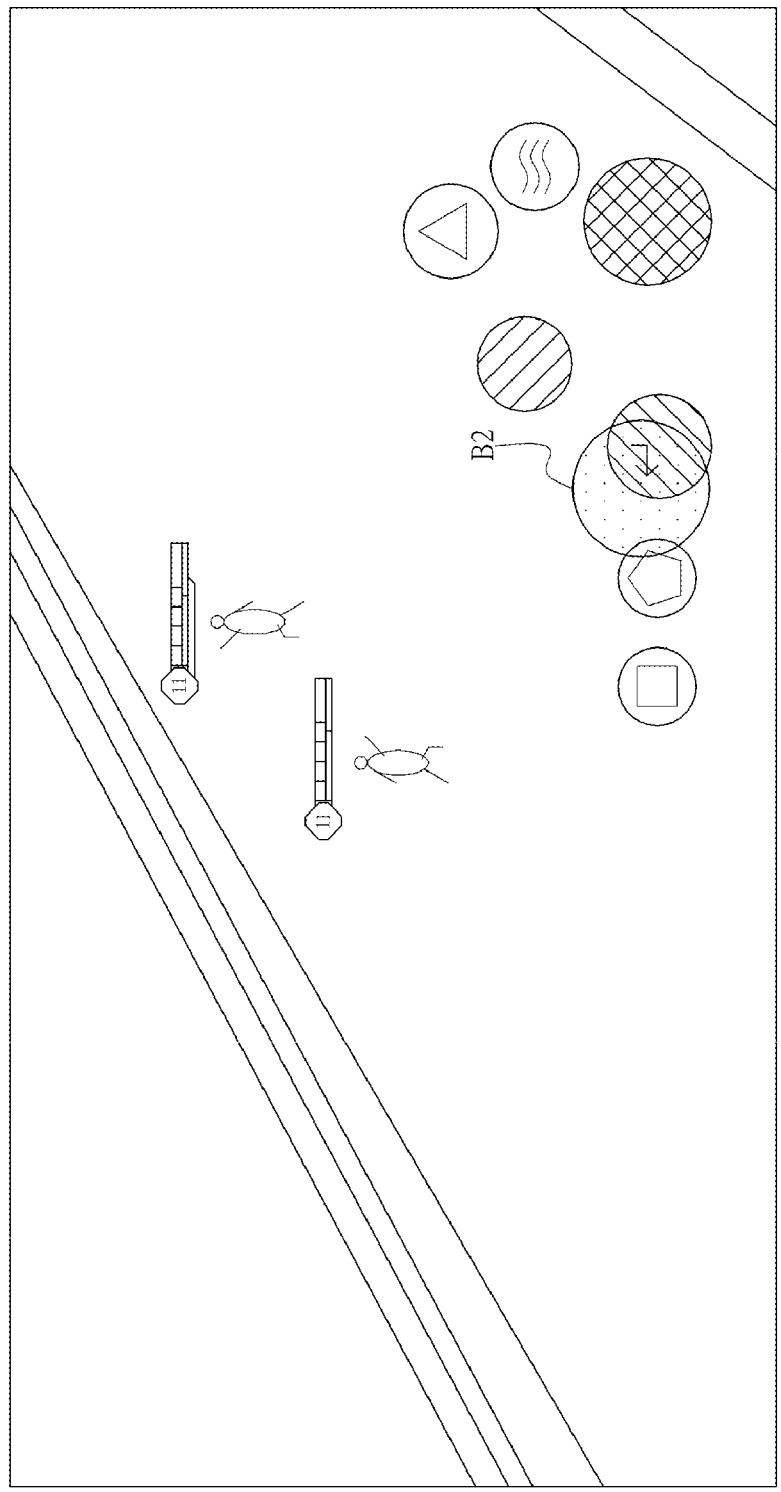
FIG. 5 is a schematic diagram of a setting interface according to another embodiment of the disclosure.

The embodiment in FIG. 4 shows a process of generating a square selected area B1 for the user to determine an image that needs to generate a vibration sense. FIG. 5 is a schematic diagram of a setting interface according to another embodiment of the disclosure. Compared with the embodiment in FIG. 4, this embodiment shows a process of generating a circular selected area B2 for the user to determine an image that needs to generate a vibration sense.

Then, in step S240, a location of the target image TI is determined on a picture 122, and a vibration enabling area A1 is defined based on the location of the target image TI. The vibration enabling area A1, similar to a virtual key, triggers the motor 140 to generate the vibration effect.

Step S240 is to find an image the same as or similar to the target image TI on the picture 122 and determine a location of the image as the vibration enabling area A1. Specifically, in step S240, pixel similarity between the target image TI and each area on the picture 122 is compared through scanning, and an area with pixel similarity higher than a default value is defined as the vibration enabling area A1.

In an embodiment, step S240 is to determine a coordinate location (or range) of the target image TI on the picture 122, to define the vibration enabling area A1.

Next, in step S260, the vibration enabling area A1 is defined as related to the control instruction M0. In this way, as long as the user touches the vibration enabling area A1 on the picture 122, the control instruction M0 controls the motor 140 to generate the vibration effect.

The vibration control method in this embodiment includes a setting step (that is, step S220) for determining the target image TI and defining the vibration enabling area A1 on the picture 122 by using the target image TI, but the disclosure is not limited thereto. In some other embodiments, the control unit 160 of the electronic device 100 directly defines the vibration enabling area A1 on the picture 122 according to default logic. The default logic is, in an embodiment, an area with a circular frame or a square frame on the picture 122. The area with a circular frame or a square frame in a game scenario generally corresponds to a control key.

The step of defining the vibration enabling area A1 on the picture 122 based on the target image TI mentioned in the foregoing embodiment is not limited to defining a single vibration enabling area A1. When there is a plurality of independent areas conforming to the target image TI of the disclosure on the picture 122, these areas are all defined as vibration enabling areas A1 and are related to the control instruction M0.

Figure 6:
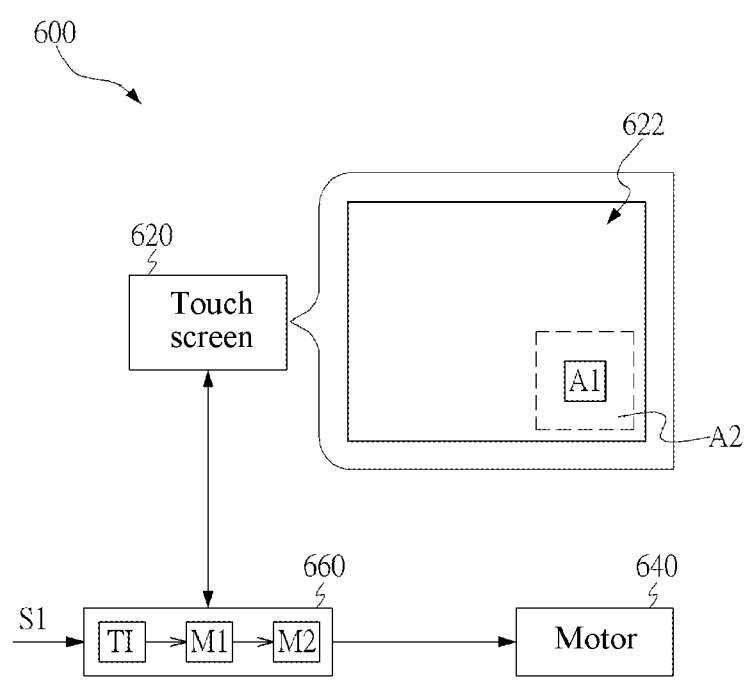
FIG. 6 is a schematic diagram of an electronic device adapted to generate a vibration effect according to a second embodiment of the disclosure.

FIG. 6 is a schematic diagram of an electronic device 600 adapted to generate a vibration effect according to a second embodiment of the disclosure.

Compared with the electronic device 100 shown in FIG. 1, the electronic device 600 in this embodiment includes a control unit 660 that determines a target image TI, a first control instruction M1, and a second control instruction M2 based on a setting signal S1. The target image TI is used for defining a vibration enabling area A1 on a picture 622. The first control instruction M1 and the second control instruction M2 are used for controlling a motor 640 to generate different vibration effects.

The control unit 660 defines the vibration enabling area A1 on the picture 622 of a touch screen 620 based on the target image TI, and defines the vibration enabling area A1 as related to the first control instruction M1. When a touch action is detected in the vibration enabling area A1, the control unit 660 defines a peripheral area A2 of the vibration enabling area A1 as related to the second control instruction M2.

When a user touches the vibration enabling area A1 on the picture 622, the motor 640 is controlled to generate a vibration effect based on the first control instruction M1, and simultaneously the peripheral area A2 of the vibration enabling area A1 is also triggered. When a finger of the user moves from the vibration enabling area A1 to the peripheral area A2, the second control instruction M2 controls the motor 640 to generate a vibration effect different from the vibration effect corresponding to the first control instruction M1.

Figure 7:
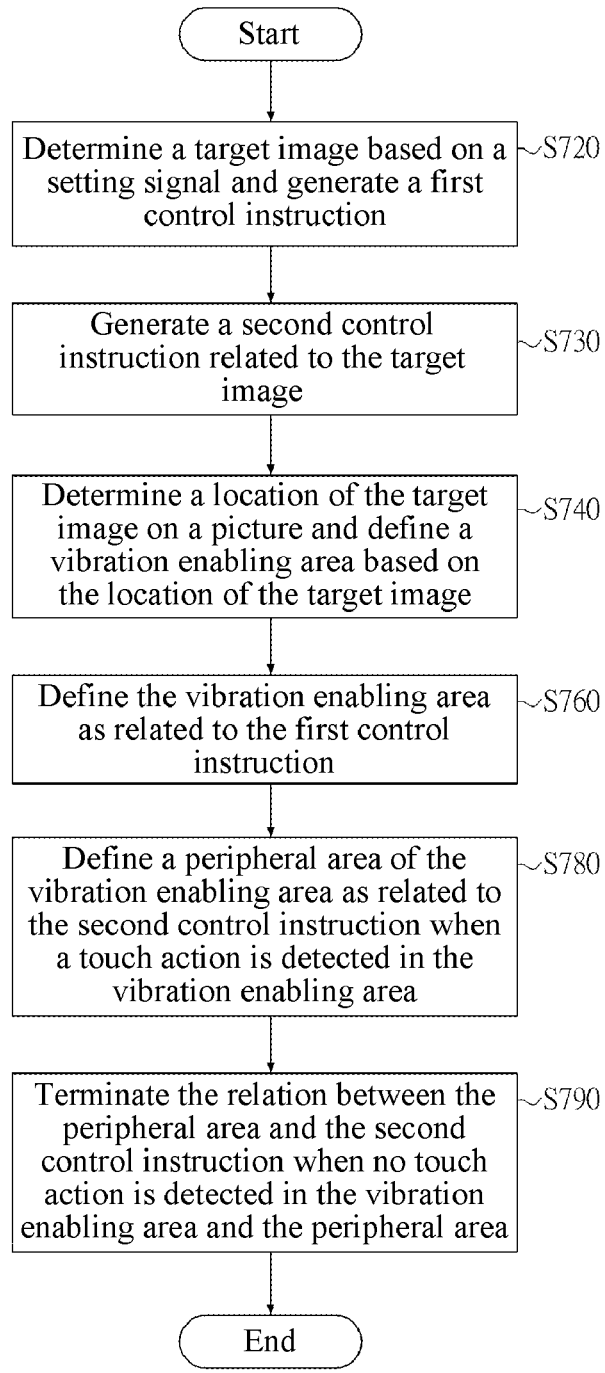
FIG. 7 is a flowchart of a vibration control method according to a second embodiment of the disclosure.

FIG. 7 is a flowchart of a vibration control method according to a second embodiment of the disclosure. The vibration control method is adapted to the electronic device 600 shown in FIG. 6. The vibration control method in this embodiment includes the following steps.

First, in step S720, a target image TI is determined based on a setting signal S1, and a first control instruction M1 is generated. The first control instruction M1 is related to the target image TI.

Then, in step S730, a second control instruction M2 related to the target image TI is generated. The second control instruction M2 is different from the first control instruction M1.

Next, in step S740, a location of the target image TI is determined on a picture 622, and a vibration enabling area A1 is determined based on the location of the target image TI. Then, in step S760, the vibration enabling area A1 is defined as related to the first control instruction M1.

Next, in step S780, when a touch action is detected in the vibration enabling area A1, a peripheral area A2 of the vibration enabling area A1 is defined as related to the second control instruction M2. During the touch action, the peripheral area A2 is constantly related to the second control instruction M2.

Then, in step S790, when no touch action is detected in the vibration enabling area A1 and the peripheral area A2, the relation between the peripheral area A2 and the second control instruction M2 is terminated.

In this way, when the user touches the vibration enabling area A1 on the picture 622, the motor 640 is controlled to generate the vibration effect based on the first control instruction M1, and simultaneously the peripheral area A2 of the vibration enabling area A1 is also triggered.

When a finger of the user moves from the vibration enabling area A1 to the peripheral area A2, the second control instruction M2 controls the motor 640 to generate a different vibration effect, until the finger of the user leaves the touch screen 120 or moves out of the vibration enabling area A1 and the peripheral area A2.

In an embodiment, the first control instruction M1 is set to control the motor 640 to vibrate for a long time, and the second control instruction M2 is set to control the motor 640 to vibrate for a short time or vibrate intermittently.

In an embodiment, the peripheral area A2 surrounds the vibration enabling area A1 and does not overlap with the vibration enabling area A1.

Figure 8:
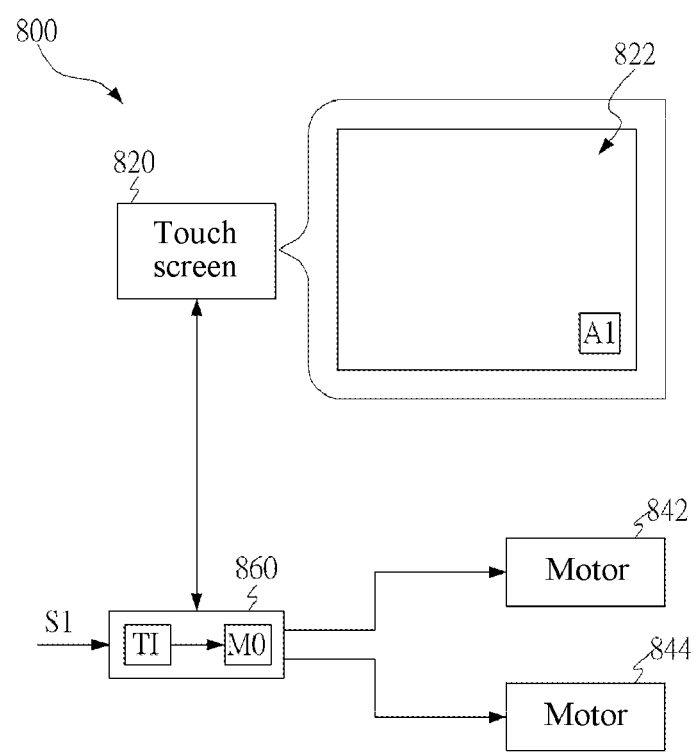
FIG. 8 is a schematic diagram of an electronic device adapted to generate a vibration effect according to a third embodiment of the disclosure.

FIG. 8 is a schematic diagram of an electronic device 800 adapted to generate a vibration effect according to a third embodiment of the disclosure. Compared with the electronic device 100 shown in FIG. 1, the electronic device 800 in this embodiment includes two motors 842, 844 configured to generate vibration effects. A control unit 860 determines a motor 842, 844 controlled by a control instruction M0 in the two motors 842, 844 based on a location of a vibration enabling area A1 on a picture 822, so as to generate a directional vibration sense.

In this way, as long as a user touches a location corresponding to the vibration enabling area A1 on a touch screen 820, the control unit 860 determines a motor 842, 844 to generate a vibration effect, and controls the motor 842, 844 to generate the vibration effect based on the control instruction M0.

Figure 9:
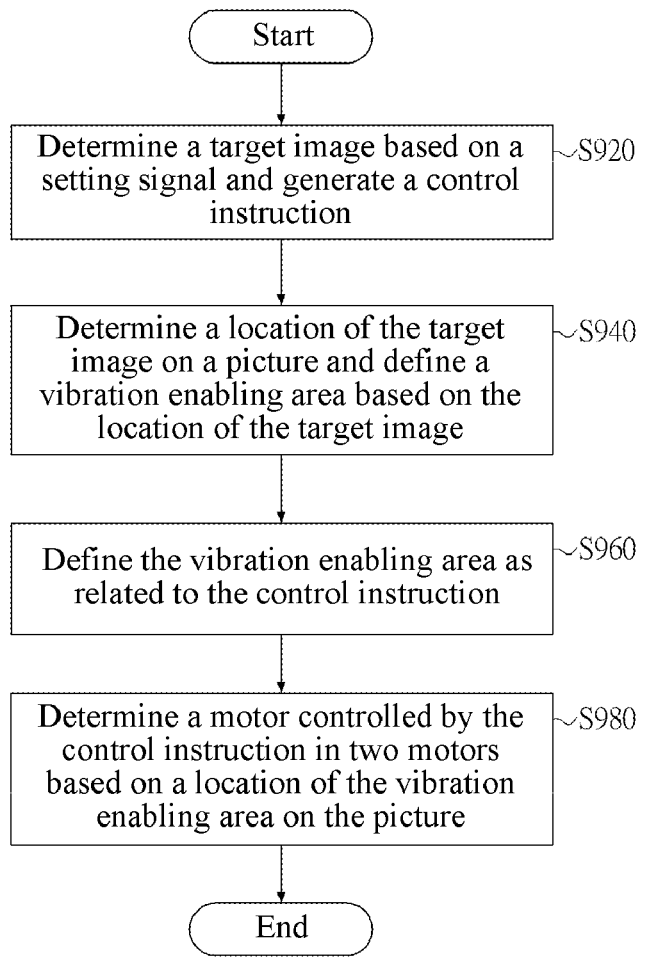
FIG. 9 is a flowchart of a vibration control method according to a third embodiment of the disclosure.

FIG. 9 is a flowchart of a vibration control method according to a third embodiment of the disclosure. The vibration control method in FIG. 9 is adapted to the electronic device 800 shown in FIG. 8.

First, in step S920, a target image TI is determined based on a setting signal S1, and a control instruction M0 is generated. The control instruction M0 is related to the target image TI.

Then, in step S940, a location of the target image TI is determined on a picture 822, and a vibration enabling area A1 is determined based on the location of the target image TI.

Next, in step S960, the vibration enabling area A1 is defined as related to the control instruction M0.

Then, in step S980, a motor 842, 844 controlled by the control instruction M0 is determined in two motors 842, 844 based on a location of the vibration enabling area A1 on the picture 822. In this way, a directional vibration sense is generated.

Figure 10:
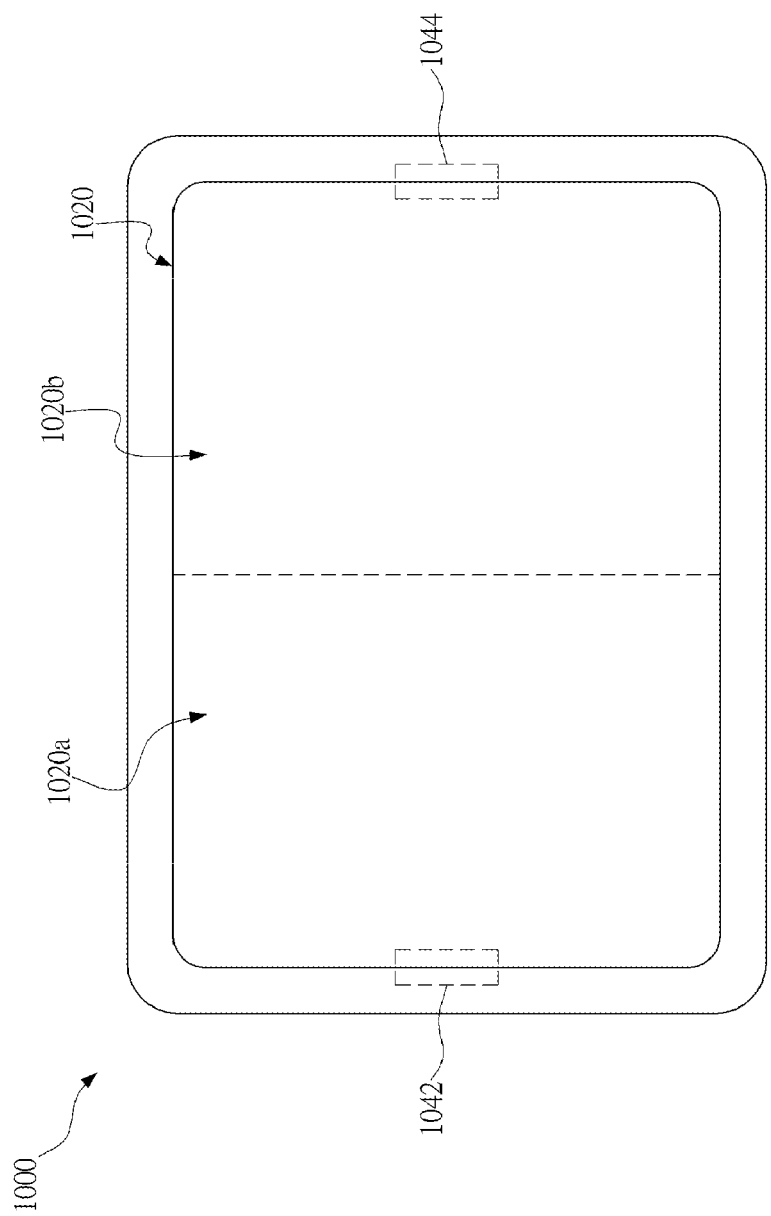
FIG. 10 is a schematic diagram of an electronic device adapted to generate a vibration effect according to a fourth embodiment of the disclosure.

Referring to FIG. 10 together, FIG. 10 is a schematic diagram of an electronic device adapted to generate a vibration effect according to a fourth embodiment of the disclosure.

As shown in the figure, an electronic device 1000 includes a touch screen 1020 and two motors 1042, 1044. The touch screen 1020 is rectangular-shaped and the two motors 1042, 1044 are adjacent to two opposite short sides of the touch screen 1020.

The touch screen 1020 is divided into two parts 1020a, 1020b along a long-side direction of the touch screen, where the two parts 1020a, 1020b correspond to the two motors 1042, 1044 respectively. When a vibration enabling area A1 falls into the left part 1020a, the motor 1042 on the left is determined as a motor controlled by a control instruction M0 to generate a vibration effect.

Otherwise, when the vibration enabling area A1 falls into the right part 1020b, the motor 1044 on the right is determined as a motor controlled by the control instruction M0 to generate a vibration effect. In this way, a directional vibration sense is provided.

According to the descriptions of this embodiment, the electronic device 1000 is provided with the two motors 1042, 1044 to generate directional vibration senses, but the disclosure is not limited thereto. According to actual requirements, the electronic device 1000 may be provided with more motors to provide subtler vibration senses. In an embodiment, in addition to the motors 1042, 1044 on the left and right sides of the electronic device 1000, a motor is arranged in the middle of a lower edge of the electronic device 1000 to generate an undirectional vibration effect.

Through the vibration control method and the electronic device 100, 600, 800, 1000 provided by the disclosure, a vibration enabling area A1 is defined on a picture 122, 622, 822 based on a target image TI, and the vibration enabling area A1 is defined as related to a control instruction M0. When the user touches the vibration enabling area A1, the control instruction M0 causes the motor 140, 640, 842, 844, 1042, 1044 to generate a vibration effect. In this way, the user is provided with tactile feedback as that for operating a physical key, thereby eliminating defects in a conventional touch operation.

The above is merely exemplary embodiments of the disclosure, and does not constitute any limitation on the disclosure. Any form of equivalent replacements or modifications to the technical means and technical content disclosed in the disclosure made by a person skilled in the art without departing from the scope of the technical means of the disclosure still fall within the content of the technical means of the disclosure and the protection scope of the disclosure.

What is claimed is:

1. A vibration control method, adapted to an electronic device, wherein the electronic device comprises a control unit, a touch screen and a motor, the control unit is electrically coupled to the touch screen and the motor, the touch screen is configured to show a picture, and the motor is configured to generate a first vibration effect and a second vibration effect, the vibration control method comprising:
generating, by the control unit, a first control instruction and a second control instruction for controlling the motor to generate the first and second vibration effects, wherein the first control instruction is used for controlling the motor to generate the first vibration effect, and the second control instruction is used for controlling the motor to generate the second vibration effect;
scanning the picture to locate a plurality of areas;
defining, by the control unit, only the area with a circular frame or a square frame as a vibration enabling area on the picture;
defining the vibration enabling area as related to the first control instruction, for triggering the motor to generate the first vibration effect;
controlling, by the control unit, the motor to generate the first vibration effect by using the first control instruction;
defining, by the control unit, a peripheral area of the vibration enabling area as related to the second control instruction when a touch action is detected in the vibration enabling area; and
controlling, by the control unit, the motor to generate the second vibration effect by using the second control instruction when the touch action moving to the peripheral area is detected.

2. The vibration control method according to claim 1, wherein the first and second control instructions each comprise a motor control parameter set.

3. The vibration control method according to claim 2, wherein the motor control parameter set comprises a vibration time parameter and a vibration intensity parameter.

4. The vibration control method according to claim 1, the vibration control method further comprising:
defining a peripheral area of the vibration enabling area as related to the second control instruction in a case that a touch action is detected in the vibration enabling area.

5. The vibration control method according to claim 1, further comprising the step of determining a target image based on a setting signal and the step of determining the target image based on the setting signal comprises:
using the touch screen to show a setting interface;
determining a selected area on the setting interface based on the setting signal; and
recording a part of the picture corresponding to the selected area as the target image.

6. The vibration control method according to claim 5, further comprising the step of determining a location of the target image on the picture and defining another vibration enabling area based on the location of the target image, wherein the step of determining the location of the target image on the picture is implemented by using an image processing method of graph similarity evaluation.

7. A vibration control method, adapted to an electronic device, wherein the electronic device comprises a control unit, a touch screen and two motors that are located on opposite sides of the touch screen, the control unit is electrically coupled to the touch screen and the motor, the touch screen is configured to show a picture, and the two motors are configured to generate a first vibration effect and a second vibration effect, the vibration control method comprising:
generating, by the control unit, a first control instruction and a second control instruction for controlling the motors to generate the first and second vibration effects, wherein the first control instruction is related to the target image and used for controlling the motors to generate the first vibration effect, and the second control instruction is used for controlling the motors to generate the second vibration effect;
scanning the picture to locate a plurality of areas;
defining, by the control unit, only an area with a circular frame or a square frame as a vibration enabling area on the picture; and
defining the vibration enabling area as related to the first control instruction for triggering the motor to generate the first vibration effects; and
determining a motor controlled by the first control instruction in the two motors based on a location of the vibration enabling area on the picture;
controlling, by the control unit, the motor to generate the first vibration effect by using the first control instruction;
defining, by the control unit, a peripheral area of the vibration enabling area as related to the second control instruction when a touch action is detected in the vibration enabling area; and
controlling, by the control unit, the motor to generate the second vibration effect by using the second control instruction when the touch action moving to the peripheral area is detected.

8. The vibration control method according to claim 7, wherein the step of determining the motor controlled by the first and second control instructions in the two motors based on the location of the vibration enabling area on the picture comprises:
dividing the touch screen into two parts based on locations of the two motors;
determining a part to which the vibration enabling area belongs in the two parts; and
determining the motor corresponding to the part to which the vibration enabling area belongs as the motor controlled by the control instruction.

9. The vibration control method according to claim 8, wherein the touch screen is rectangular-shaped, the two motors are adjacent to two opposite short sides of the touch screen, and the step of dividing the touch screen into the two parts based on locations of the two motors comprises dividing the touch screen into the two parts along a long-side direction of the touch screen.

10. An electronic device, comprising:
a touch screen, configured to show a picture;
a motor, configured to generate a first vibration effect and a second vibration effect; and
a control unit, electrically coupled to the touch screen and the motor, wherein the control unit is electrically coupled to the touch screen and the motor and configured to:
generate a first control instruction and a second control instruction, wherein the first control instruction is for controlling the motor to generate the first vibration effect and the second control instruction for controlling the motor to generate the first and second vibration effects, wherein the first control instruction is used for controlling the motor to generate the first vibration effect, and the second control instruction is used for controlling the motor to generate the second vibration effect;

scan the picture to locate a plurality of areas;

define only the area with a circular frame or a square frame as a vibration enabling area on the picture;

define the vibration enabling area as related to the first control instruction for triggering the motor to generate the first and second vibration effects;

control the motor to generate the first vibration effect by using the first control instruction;

define a peripheral area of the vibration enabling area as related to the second control instruction when a touch action is detected in the vibration enabling area; and control the motor to generate the second vibration effect by using the second control instruction when the touch action moving to the peripheral area is detected.

* * * * *